United States Patent [19]

Nguyen et al.

[11] Patent Number: 5,359,607
[45] Date of Patent: Oct. 25, 1994

[54] ADAPTIVE INTERMODULATION CONTROL

[75] Inventors: Tuan K. Nguyen, Boca Raton; Xuan-Khanh T. Tran, W. Palm Beach, both of Fla.; Richard A. Erhart, Chandler, Ariz.; David J. Hayes, Lake Worth, Fla.

[73] Assignee: Motorola, Inc., Schaumburg, Ill.

[21] Appl. No.: 791,813

[22] Filed: Nov. 13, 1991

[51] Int. Cl.$^5$ .......................................... G06F 11/00
[52] U.S. Cl. ......................... 371/5.5; 455/226.1
[58] Field of Search ................ 371/5.5; 455/226.1, 455/226.2, 226.3; 375/58, 34

[56] References Cited

U.S. PATENT DOCUMENTS

| | | | |
|---|---|---|---|
| 4,332,029 | 5/1982 | Campbell et al. | 371/5.5 |
| 4,580,262 | 4/1986 | Naylor et al. | 371/5.5 |
| 4,939,731 | 7/1990 | Reed et al. | 371/32 |
| 4,991,184 | 2/1991 | Hashimoto | 371/5.5 |
| 5,001,776 | 3/1991 | Clark | 455/226 |
| 5,036,515 | 7/1991 | Freeburg | 371/5.5 |
| 5,128,942 | 7/1992 | Kojima | 371/5.5 |
| 5,128,965 | 7/1992 | Henriksson | 371/5.5 |

*Primary Examiner*—Charles E. Atkinson
*Attorney, Agent, or Firm*—Gregg E. Rasor

[57] ABSTRACT

A radio receiver (100) having a receiver section (103) receives and processes an information signal to provide received information having an error factor that varies at least with respect to operational parameters of the receiver section (103). In the radio receiver (100), a method is embodied for adaptively controlling the operational parameters of the receiver section (103) to optimize the error factor of the received information. The method (400, 400', 400") comprises operating in a first receiver mode in response to a predetermined mode select parameter, correlating a first signal recovered from the received information to at least a portion of a first code word to establish a first error criteria, and operating in the first receiver mode while the first error criteria does not exceed a predetermined error criteria.

50 Claims, 6 Drawing Sheets

ADAPTIVE INTERMODULATION CONTROL

FIELD OF THE INVENTION

This invention relates in general to radio frequency information receivers and more particularly to a radio frequency information receiver capable of adaptively controlling receiver intermodulation distortion.

BACKGROUND OF THE INVENTION

Radio communication systems typically use a receiver (e.g., a selective call receiver or "pager") that has at least one unique call address associated therewith. These radios receive and correlate an address to the at least one unique call address, then decode an optional message and alert a user. After being addressed, the receiver preferably decodes and presents at least a portion of a received message via a presentation means. Considering the preceding discussion, one of ordinary skill in the art can appreciate that radio communication systems are an excellent vehicle for delivering voice, numeric, alphanumeric or coded information.

Contemporary radio receivers sometimes employ an automatic gain control (AGC) to control distortion resulting from a signal overload condition. Typically, an AGC receiver adjusts a gain of a radio frequency amplifier in a receiver section to reduce signal distortion. A variety of AGC detection schemes can be used to control the adjustment process. Two examples of prior art AGC detection schemes are monitoring a received signal strength indicator (RSSI) and monitoring a current drain in the radio frequency amplifier. In the case of a RSSI, a relative signal strength is detected and compared to a predetermined level. If the detected signal strength exceeds the predetermined level, the AGC is activated, thereby reducing the gain of the radio frequency amplifier and in most cases, eliminating the signal overload condition. The current drain monitoring topology functions in much the same manner, controlling the gain of the radio frequency amplifier in response to a relative (or absolute) current drain detected. A detailed example of a prior art intermodulation controlled communication system employing a form of AGC is discussed in U.S. Pat. No. 5,001,776 entitled: "COMMUNICATION SYSTEM WITH ADAPTIVE TRANSCEIVERS TO CONTROL INTERMODULATION DISTORTION", issued to Edward T. Clark and assigned to Motorola, Inc.

One of ordinary skill in the art will appreciate that the preceding methods and apparatus must operate dynamically to effectively implement their respective AGC schemes. Dynamic operation allows these apparatus respond to signal strength changes in "real time." However, because of the sensing methods used, each of the preceding approaches operate at fairly constant high power levels, thus causing a considerable decrease in battery life if implemented in a portable paging receiver. Furthermore, because of the size constraints imposed on state-of-the-art portable paging receivers, the only alternatives available for powering these receivers are a single cell AA or AAA battery. Since the RSSI, local oscillator, or radio frequency amplifier current sensing topologies discussed operate on five or more volts D.C., their implementation in a portable paging receiver is undesirable. It is clear that an alternative topology and method must be found to allow a portable paging receiver to implement a signal quality control mechanism, thereby improving its operating characteristics and usefulness in a high interfering signal strength environment.

SUMMARY OF THE INVENTION

Briefly, according to the invention, there is provided a radio receiver that receives and processes an information signal to provide received information having an error factor that varies at least with respect to operational parameters of the receiver section. In the radio receiver, a method is embodied for adaptively controlling the operational parameters to optimize the error factor of the received information comprising the steps of operating in a first receiver mode in response to a predetermined mode select parameter, correlating a first signal recovered from the received information to at least a portion of a first code word to establish a first error criteria, and operating in the first receiver mode while the first error criteria does not exceed a predetermined error criteria.

The preferred embodiment of the radio receiver comprises means for operating in a first receiver mode in response to a predetermined mode select parameter, means for correlating a first signal recovered from the received information to at least a portion of a first code word to establish a first error criteria, and means for operating in the first receiver mode while the first error criteria does not exceed a predetermined error criteria.

DESCRIPTION OF A PREFERRED EMBODIMENT

Figure 1:
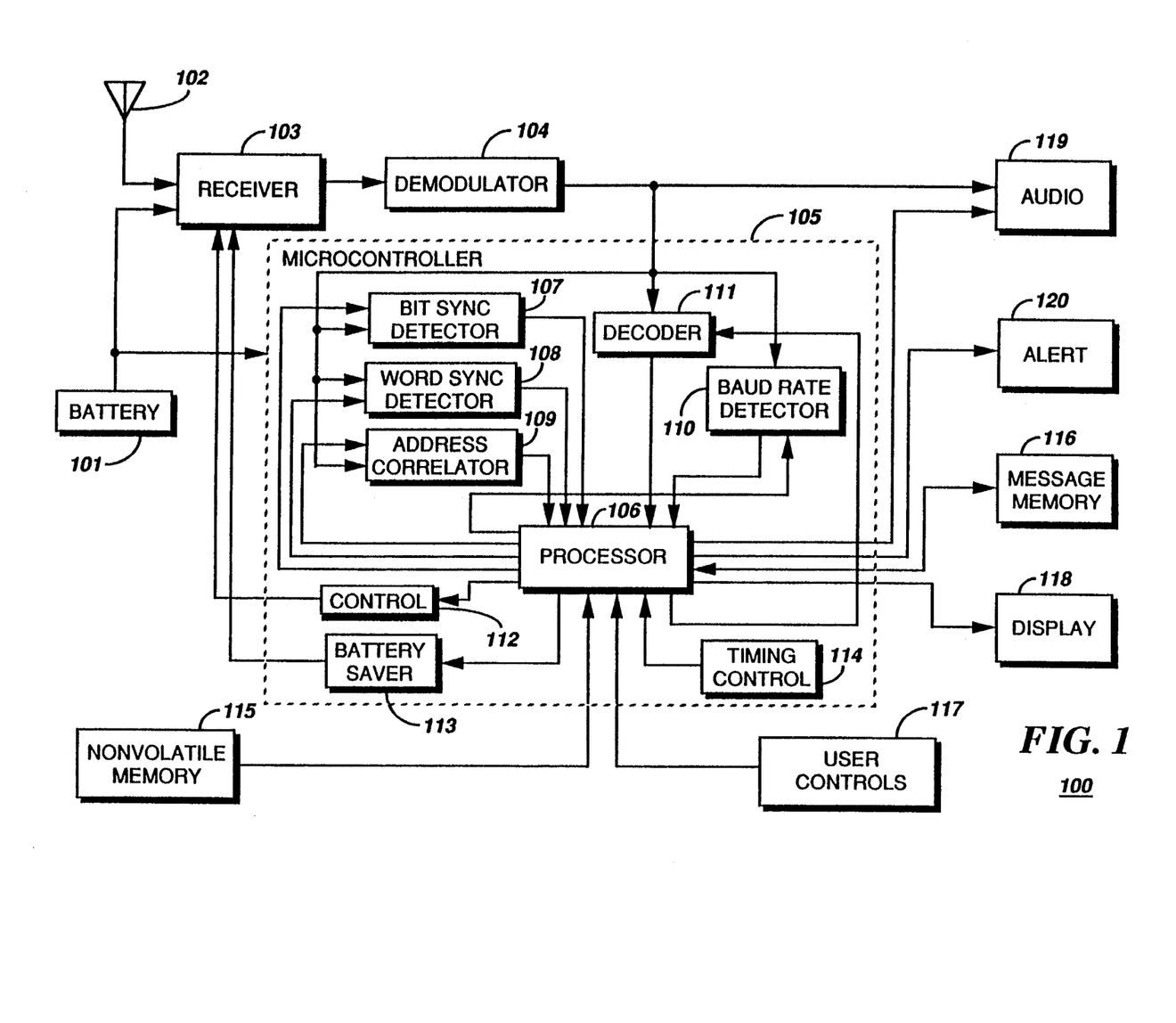
FIG. 1 is a block diagram of a selective call receiver having a microcontroller operating in accordance with the preferred embodiment of the present invention.

Referring to FIG. 1, a battery 101 powered selective call receiver 100 operates to receive a signal via an antenna 102. A receiver 103 couples the received signal to a conventional demodulator 104 that is capable of recovering analog or digital information. Received digital information is recovered as a serial bit stream that is then coupled to a micro-controller 105 for interpreting and decoding the serial bit stream as address, control, and data signals. In the preferred embodiment, the micro-controller 105 may comprise a processor 106, a bit synchronization detector 107, a word synchronization detector 108, an address correlator 109, a baud rate detector 110, a data decoder 111, a control circuit 112, a battery saver 113, and a timing control 114, implemented in hardware, software, or a combination thereof. Examples of commercially available microcontrollers suitable for implementing the preferred embodiment of the present invention are Motorola's MC68HC05xx or M68HC11xx. Complete descriptions of these devices are available in Motorola's data book set entitled "Microprocessor, Microcontroller, and Peripheral Data," volumes I and II, Series A, © 1988 by MOTOROLA, INC.

More specifically, in the micro-controller 105 the serial bit stream is coupled to the baud rate detector 110 that determines a receiving data rate associated with the recovered information. When the receiving data rate is determined, the bit synchronization detector 107 establishes synchronization between the micro-controller's 105 data decoding components (106, 109, and 111) and the individual signals (e.g., address, control, and data signals) in the recovered information. Once bit synchronization is established, the word synchronization detector 108 searches the serial bit stream for information indicating the beginning of a batch or frame. When the micro-controller 105 has established both bit and word synchronization, the recovered information is searched for a group identification code associated with the selective call receiver. When the selective call receiver's group identification code is found, the receiver will search only those code frames associated with the receiver's group for pages intended for the selective call receiver. During the period between like frames, the micro-controller 105 will "shut-down" the receiver 103 and demodulator 104, thereby conserving battery power. The predetermined interval between like frames is known in the art as a "sleep" period. Since the system protocol is designed such that pages targeted for a specific group identifier, of which each selective call receiver is a member of at least one group, are sent only during the transmission of that group, no pages are missed during the sleep period. A receiver that operates in the fashion discussed above is said to be operating in a "battery saving" mode.

In determining the selection of a particular selective call receiver, a correlation is performed between a predetermined address associated with the selective call receiver and a received address. To accomplish this, the address correlator 109, which comprises a signal processor, correlates a recovered address with the predetermined address or addresses stored in the selective call receiver's non-volatile memory 115 or code plug. The non-volatile memory 115 typically has a plurality of registers for storing a plurality of configuration words that characterize the operation of the selective call receiver. When the addresses correlate, the microcontroller 105 may in a tone-only mode activate an alert 120. Alternatively, if a data (numeric or alphanumeric) address is received, the decoder 111 couples message information to the message memory 116.

In accordance with the recovered information, and settings associated with the user controls 117, the selective call receiver presents at least a portion of the message information, such as by a display 118 or an audio section 119, and signals the user via an audible, visual, or tactile alert 120 that a message has been received. The user may view information that is automatically presented on the display 118 or manually presented in response to activating the appropriate user controls 117.

The micro-controller 105 may also include items such as a conventional signal multiplexer, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to provide an information receiver as requested by a customer.

Figure 2:
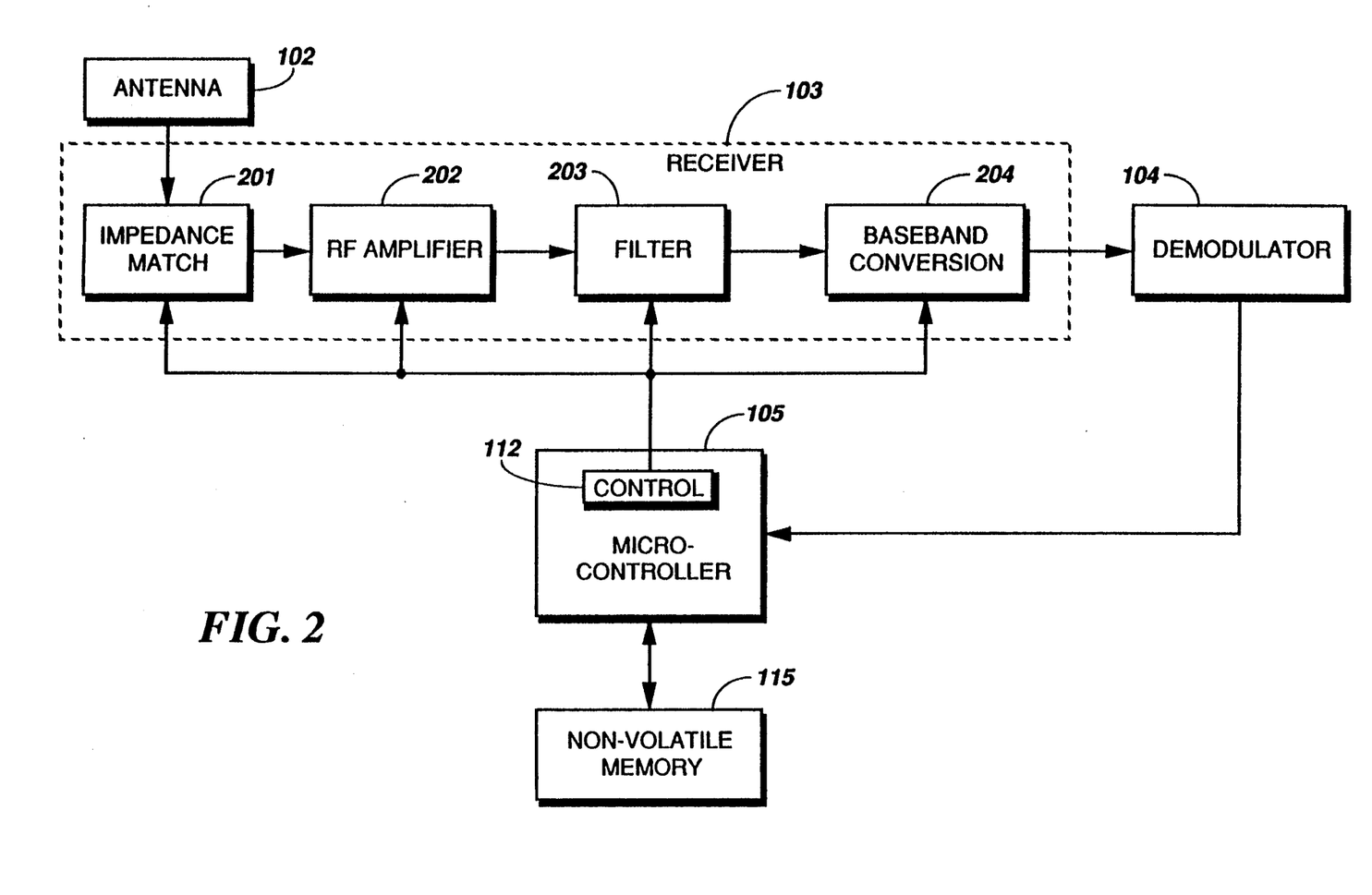
FIG. 2 is a block diagram of a selective call receiver having a receiver operating in accordance with the preferred embodiment of the present invention.

Referring to FIG. 2, the selective call receiver from FIG. 1 is illustrated showing the internal components of the receiver section 103. As in the discussion in reference to FIG. 1, the antenna 102 is responsive to receive a radio frequency signal. The signal received by the antenna 102 is coupled to a radio frequency (RF) amplifier 202 via an impedance matching circuit 201. After amplification, the received signal is selectively filtered by a filter 203 then converted to baseband for demodulation using a baseband converter 204. The output of the baseband converter 204 is coupled to the demodulator 104 that recovers any modulated information from the received signal.

In the preferred embodiment, a microcontroller 105 as detailed in FIG. 1 decodes digital data from the serial bit stream recovered by the demodulator 104. The microcontroller 105 has a control section 112 for the selective independent adjustment of the operational parameters of any element in the receiver 103. As an example, if a secondary radio frequency signal is received by the antenna 102 and presented to the impedance match 201, one may want to adjust the frequency response of the impedance match 201 to attenuate the unwanted secondary radio frequency signal. In another example, if an unwanted signal is impressed on the RF amplifier 202 along with a desired signal, intermodulation distortion (IMD) may result. Since the level of IMD produced by a device is strongly related to the non-linearities associated with the device, and reducing the gain typically linearizes the operating region, IMD can be controlled by detecting the quality of the received signal and adjusting the receiver's parameters to achieve a more linear operation. In the case of an active device such as an amplifier, reducing the input level of the unwanted signal typically results in a corresponding decrease in the distortion present in the received signal.

Any number of methods can be applied to reduce the level of the unwanted signal presented to any of the receiver's 103 elements 201, 202, 203, 204. An alternative method for controlling distortion in a conversion section such as the baseband converter 204 is disclosed in U.S. Pat. No. 5,001,776 entitled: "COMMUNICATION SYSTEM WITH ADAPTIVE TRANSCEIVERS TO CONTROL INTERMODULATION DISTORTION", issued to Edward T. Clark and assigned to Motorola, Inc., the teachings of which are hereby incorporated by reference. This United States Patent discusses in a first embodiment, an apparatus that measures a quality of a received signal. In response to the quality being less than a predetermined quality factor, an adjustment is made in the drive level of a local oscillator signal that is used for effecting a conversion of a radio frequency signal from a first frequency to a second frequency. The Clark patent further discusses an optional control mechanism that regulates the gain of a radio frequency amplifier to prevent signal overload. Further, Clark discusses the exchange of coded responses that control a transmission power of a unit sending the radio frequency signal. In a second embodiment, Clark discusses a RSSI detector that determines a relative signal strength of the received signal. A controller then adapts the radio frequency amplifier's gain and local oscillator drive level in response to the detected signal quality and the relative signal strength.

The instant invention adds to Clark a predetermined mode select parameter that is programmed in a non-volatile memory 115. This improvement allows instantaneous response when the receiver "wakes up" from the battery saver mode discussed in reference to FIG. 1. Furthermore, during operation (including battery saving cycles) of the radio receiver shown in FIG. 1, operational parameters are maintained, thus achieving improved power savings by eliminating the need to re-characterize the signal quality each time the receiver "wakes-up." This advantage further prolongs the receiver's battery life by eliminating unnecessary signal characterization cycles that would be present if no history was maintained. Another advantage of the present invention is that all signal quality measurements are performed using statistical correlations on a specific code word. This virtually eliminates any uncertainty as to an absolute quality of the received signal because coded data is used as a reference. In comparing this method to prior art signal quality measurement systems, one of ordinary skill in the art can easily see that an improvement of 20 to 30 dB in signal quality measurement is achieved when using coded data versus uncoded data or analog signal to noise ratio measurements. Moreover, prior art signal quality measurement systems cannot reliably measure a signal quality when a receiver is operating at or near its sensitivity threshold. Because the present invention uses coded data to effect signal quality measurements, it operates with equal accuracy over a range of signal levels spanning the entire dynamic range of the receiver.

As an example, the preferred embodiment decodes a 31,16 BCH codeword. 31,16 BCH is a distance 7 cyclic code that can be used to correct up to 3 bit errors or detect up to 6 bit errors. In this example, the embodiment is chosen to correct up to 2 bit errors and detect up to 4 bit errors in a 31 bit word. Therefore, when a 31,16 BCH codeword is received, the decoder 111 may use Peterson's Direct Solution Method to determine which of the following four classifications the word falls into:

TABLE 1

| Class | Bit Errors | Criteria |
|---|---|---|
| 1 | 0 | $\sigma 1 = 0$ and $\sigma 2 = 0$ and $\sigma 3 = 0$ |
| 2 | 1 | $\sigma 1 \neq 0$ and $\sigma 2 = 0$ and $\sigma 3 = 0$ |
| 3 | 2 | $\sigma 1 \neq 0$ and $\sigma 2 \neq 0$ and $\sigma 3 = 0$ |
| 4 | >2 | $\sigma 1 \neq 0$ and $\sigma 2 \neq 0$ and $\sigma 3 \neq 0$ |

Thus, by receiving any number of these words and adding up the number of bit errors received a bit error rate (BER) can be calculated. In 31,16 BCH, the generating polynomial is expressed as:

$$G(X) = X^{15} + X^{11} + X^{10} + X^9 + X^8 + X^7 + X^5 + X^3 + X^2 + X + 1$$

where the argument X is a received code word and G(X) is the resulting check word. For a received code word with information bits =0000000100001000, the check bits are 111010000010010. The table below illustrates the reception of the same code word in four different time slots, each reception having a different number of bit errors:

TABLE 2

| Time | R(X) | Bit Errors |
|---|---|---|
| $t_0$ | 0000000100001000111010000010010 | 0 |
| $t_1$ | 0001000100001000111010000010010 | 1 |
| $t_2$ | 0000000100000000111010010010010 | 2 |
| $t_3$ | 0010000100001001101010000011010 | 4 |

Using Peterson's Direct Solution Method, the syndromes can be calculated as:

TABLE 3

| Time | S1 | S3 | S3 |
|---|---|---|---|
| $t_0$ | 00000 | 00000 | 00000 |
| $t_1$ | 01011 | 00110 | 00111 |
| $t_2$ | 10111 | 10111 | 00110 |
| $t_3$ | 11101 | 11111 | 01011 |

And from the syndromes, $\sigma 1$, $\sigma 2$, $\sigma 3$ are calculated and the criteria from TABLE 1 is applied:

TABLE 4

| Time | $\sigma 1$ | $\sigma 2$ | $\sigma 3$ | Errors |
|---|---|---|---|---|
| $t_0$ | 00000 | 00000 | 00000 | 0 |
| $t_1$ | 01011 | 00000 | 00000 | 1 |
| $t_2$ | 10111 | 11001 | 00000 | 2 |
| $t_3$ | 11101 | 11111 | 10001 | >2 |

Another method which can be used to determine bit error rate (BER), is comparing the value of a received 31,16 BCH word to a predetermined BCH word. A bit-by-bit correlation is performed in this case by "Exclusive-OR"ing the bits of the received word with the bits of a predetermined correct word. The resulting word will have all like bits if no errors are present and at least one un-like bit if any errors are detected. The total number of bit errors in this case would be equal to the number of bits differing from the total word bits in an error free word.

Thus, by receiving a number of these words and adding up the number of bit errors received, an effective BER can be calculated. Using the data from the previous example, bit-by-bit correlations are performed as illustrated in TABLE 5 below:

TABLE 5

| R (X) | R (X) ⊕ T (X) | Errors |
|---|---|---|
| 0000000100001000111010000010010 | 0000000000000000000000000000000 | 0 |
| 0001000100001000111010000010010 | 0001000000000000000000000000000 | 1 |
| 0000000100000000111010010010010 | 0000000000001000000000010000000 | 2 |
| 0010000100001001101010000011010 | 0010000000000101000000000001000 | 4 | where R(X) is the received data, T(X) is the predetermined value of the received data, and ⊕ is the "Exclusive-Or" operation.

Figure 3:
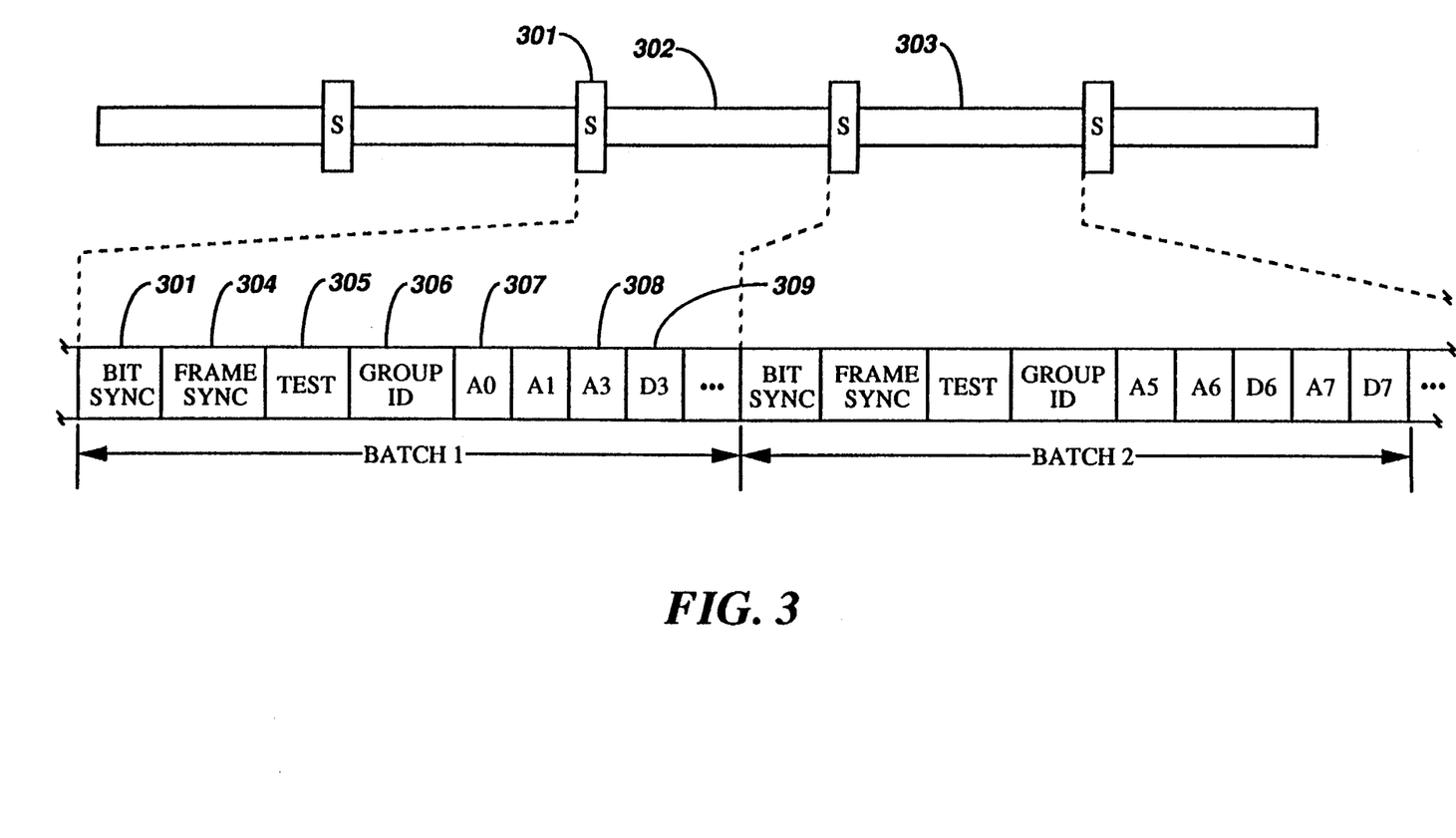
FIG. 3 is an illustration of an exemplary signalling protocol with which the preferred embodiment of the present invention may operate.

Referring to FIG. 3, the illustration shows an exemplary signalling protocol that can be utilized by the preferred embodiment of the instant invention to optimally receive the transmitted information. This exemplary protocol approximates digital selective call addressing schemes such as POCSAG (developed by Great Britain's Post Office Code Advisory Group), Nippon Telephone and Telegraph's signalling Code, or MOTOROLA's Golay Sequential Code. In the preferred embodiment, the selective call receiver of FIG. 1 operates to obtain synchronization information 301 from a radio frequency channel operating with the exemplary signalling protocol illustrated in FIG. 3. After the synchronization information 301 is acquired and protocol synchronization is achieved, the selective call receiver preferably reverts to operating in a battery saving mode. For this example, assume that the selective call receiver is a member of a group that is signalled during a first batch 302. Note that additional batches such as batch 2 303 may follow the first batch 302.

More specifically, the exemplary signalling protocol comprises a bit synchronization preamble 301, a frame synchronization word 304, an optional test word 305, a group identifier 306, a tone-only paging address word 307, a data paging address word 308, and at least one data message packet corresponding to the paging address word 308. For consistency, most signalling protocols are structured such that an area preceding (or possibly following) any paging messages contains information required to synchronize to the channel and identify a position, batch, frame, or group within the protocol. Since this area falls in the same relative time slot for each paging batch, it is an ideal candidate for use as a signal quality reference. The reason for using this area for measuring signal quality is that every selective call receiver must be capable of decoding the information in this area in order to operate on a paging system using the exemplary protocol. Furthermore, using this area allows the selective call receiver to perform a signal quality measurement at any time during operation, including a time period before complete synchronization is acquired and battery saving begins. In the preferred embodiment of the present invention, the group ID area 306 is used for sampling the signal quality because it allows for early turn-off in the cycle if the received batch is not the pager's assigned batch. By choosing the group ID area 306, battery savings are maximized.

Figure 4A:
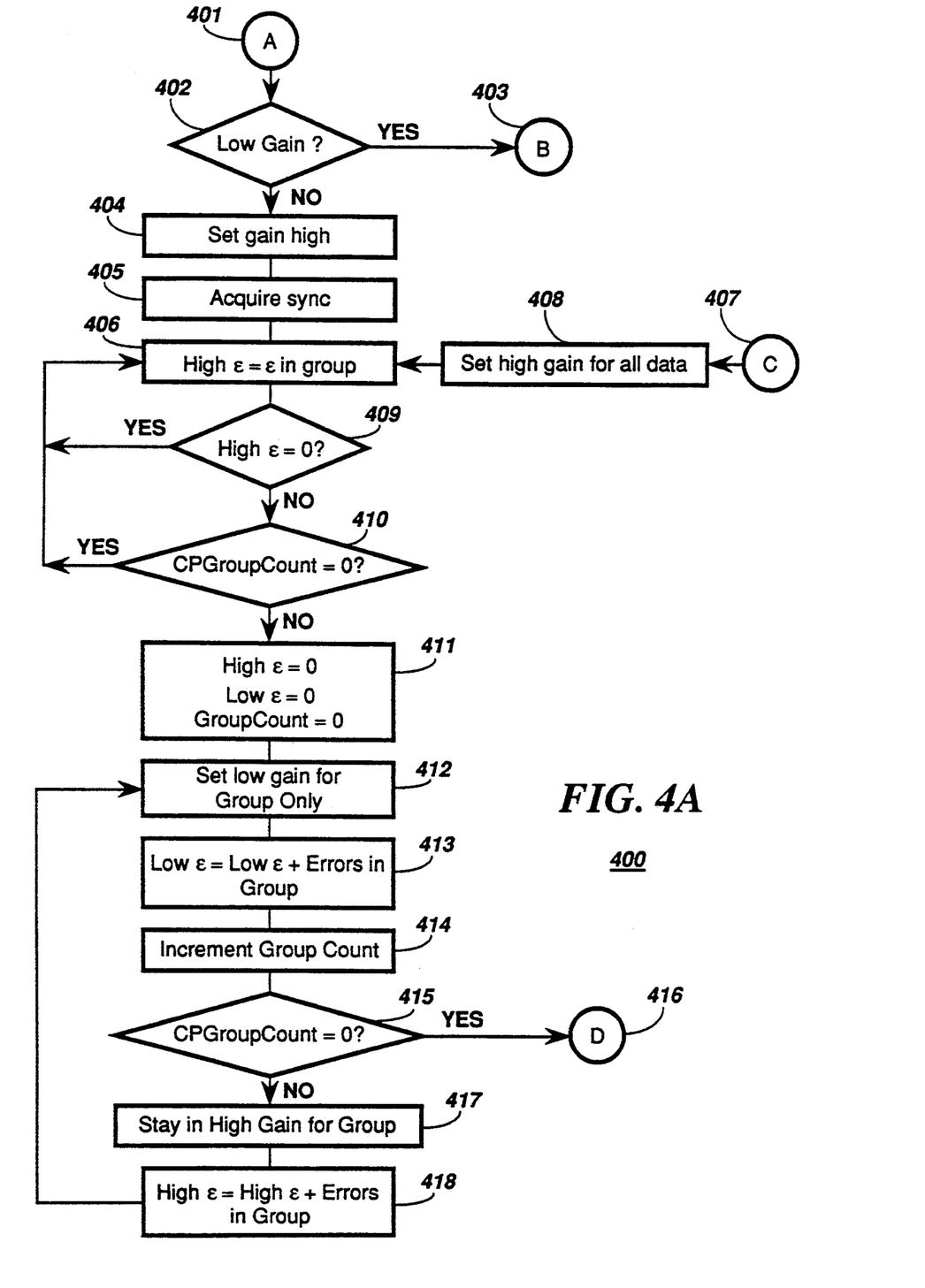
FIGS. 4A, 4B, and 4C are flow diagrams of an adaptive operating procedure for controlling the receiver in FIG. 1 and FIG. 2 in accordance with the preferred embodiment of the present invention.
Figure 4B:
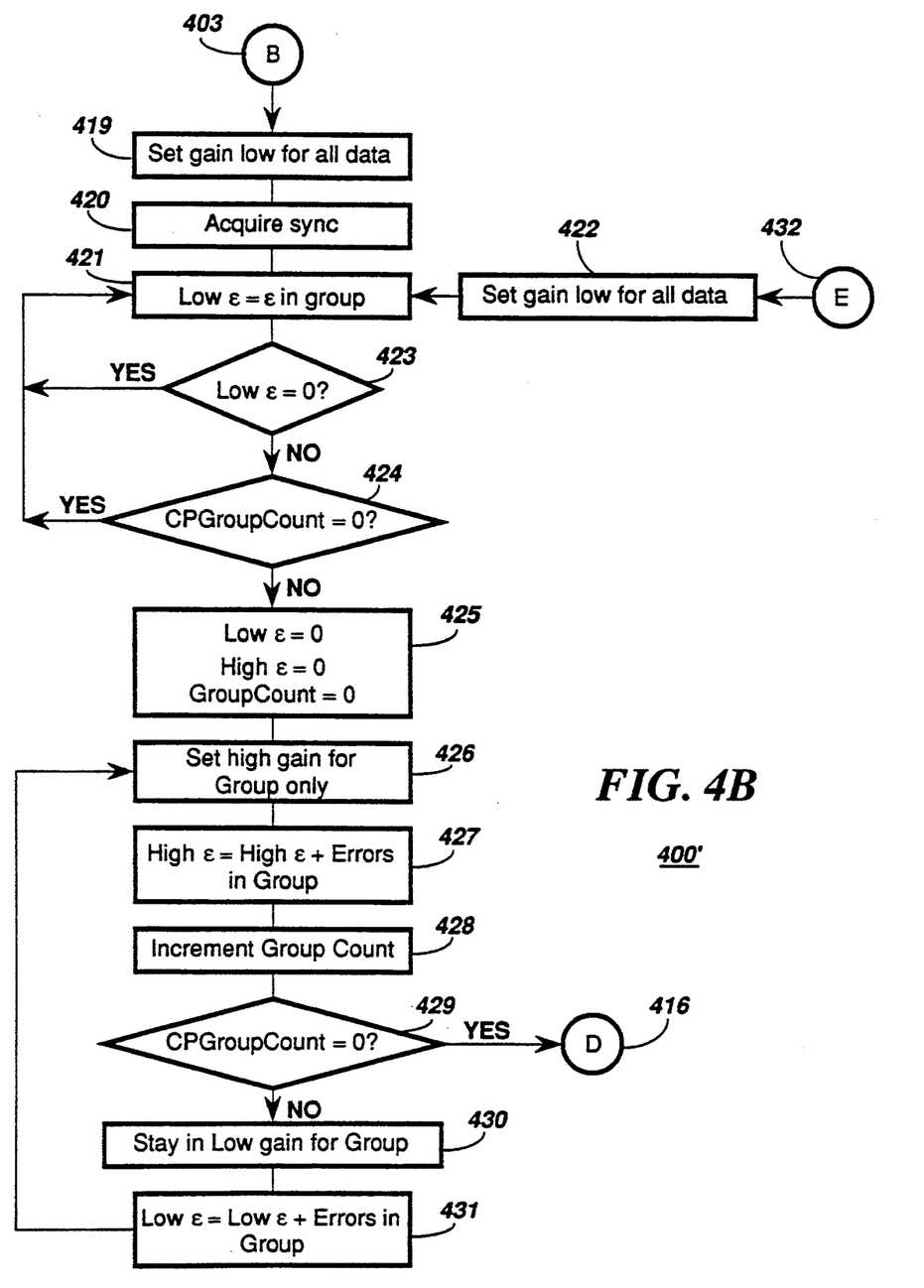
Figure 4C:
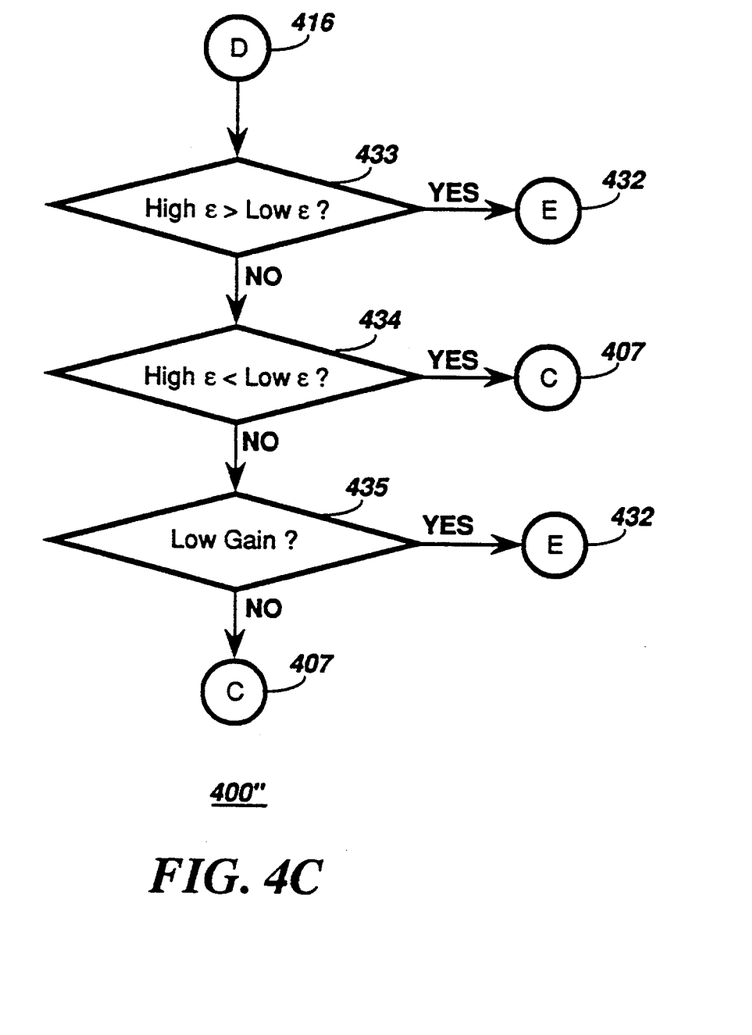

Referring to FIGS. 4A, 4B, and 4C, the respective flow diagrams 400, 400', 400'', illustrate an adaptive operating procedure for controlling the receiver in FIG. 1 and FIG. 2 in accordance with the preferred embodiment of the present invention.

Referring to FIG. 4A, when the selective call receiver is first powered on 401, a predetermined mode select parameter is read from the code plug. If the mode select parameter indicates a low gain setting for a received signal 402, the micro-controller 105 passes control to step 403. If the mode select parameter indicates a high gain setting, the micro-controller 105 sets the receiver to a high gain mode 404. After acquiring channel synchronization 405, the micro-controller 105 correlates a first signal recovered from the received information to at least a portion of a first code word to establish a first error criteria 406, the first error criteria comprising a bit error rate. A cumulative bit error rate may be established by individually accumulating a weighted number of correlation samples in each of the first and second receiver modes over several frames, batches, or groups. In the high gain mode, if no bit errors are detected 409, the micro-controller 105 will continue to correlate subsequent first signals recovered from the received information to at least a portion of the first code word for establishing a subsequent first error criteria 406. If errors are detected 409 and a value of a group count accumulator does not equal a predetermined group count 410, a high error accumulator ($\epsilon$), a low error accumulator ($\epsilon$), and the group count accumulator are initialized to zero 411 and the gain is set to low gain 412 for measuring the errors in a next received group. After the low gain mode is enabled, the micro-controller 105 correlates a second signal recovered from the received information to at least a portion of a second code word to establish a second error criteria 413, the second error criteria comprising a bit error rate. The group count accumulator is incremented (or decremented in a count-down implementation) and compared to the predetermined group count 415. If the group count accumulator's value does not match the predetermined group count, the gain is set to high gain 417 for measuring the errors in the next received group. After the high gain mode is enabled, the micro-controller 105 again correlates the first signal recovered from the received information to at least a portion of the first code word to establish a first error criteria 418. When the group count accumulator's value matches the predetermined group count 415 control is passed to step 416.

Referring to FIG. 4B, when the predetermined mode select parameter indicates the high gain setting for the received signal 402, the micro-controller 105 passes control to step 403. The micro-controller 105 sets the receiver to the low gain mode 419. After acquiring channel synchronization 420, the micro-controller 105 correlates the first signal recovered from the received information to at least a portion of the first code word to establish the first error criteria 421, the error criteria comprising a bit error rate. As described in reference to FIG. 4A, the cumulative bit error rate may be established by individually accumulating a weighted number of correlation samples in each of the first and second receiver modes over several frames, batches, or groups. In the low gain mode, if no bit errors are detected 409, the micro-controller 105 will continue to correlate subsequent first signals recovered from the received information to at least a portion of the first code word for establishing the subsequent first error criteria 421. If errors are detected 423 and the value of the group count accumulator does not equal the predetermined group count 424, the low error accumulator ($\epsilon$) the high error accumulator ($\epsilon$), and the group count accumulator are initialized to zero 425 and the gain is set to high gain 426 for measuring the errors in the next received group. After the high gain mode is enabled, the micro-controller 105 correlates the second signal recovered from the received information to at least a portion of the second code word to establish the second error criteria 427. The group count accumulator is incremented (or decremented in a count-down implementation) and compared to the predetermined group count 428. If the group count accumulator's value does not match the predetermined group count, the gain is set to low gain 430 for measuring the errors in the next received group. After the low gain mode is enabled, the micro-controller 105 again correlates the first signal recovered from the received information to at least a portion of the first code word to establish the first error criteria 431. When the group count accumulator's value matches the predetermined group count 429 control is passed to step 416.

Referring to FIG. 4C, when control is passed to step 416 via operators 415 or 429, if a value (an effective bit error rate) of the high error accumulator is greater than a value of the low error accumulator 433, control is passed to step 432 and the gain is set low for all data 422. If the value of the low error accumulator is greater than the value of the high error accumulator 434, control is passed to step 407 and the gain is set high for all data 408. In a case where the high and low errors are equal and the predetermined mode select parameter selects the low gain mode 435, control is passed to step 432 and the gain is set low for all subsequent data 422. If the high and low errors were equal and the predetermined mode select parameter selects the high gain mode 435, control is passed to step 407 and the gain is set high for all subsequent data 408.

While specific embodiments have been shown and described, further modifications and improvements will occur to those skilled in the art. All modifications which retain the basic underlying principles disclosed and claimed herein, as well as variations due to particular constraints imposed by a selected technology in implementing an apparatus that embodies the ideas and methods disclosed are considered to fall within the spirit and scope of the present invention.

We claim:

1. In a radio receiver having a receiver section that receives and processes an information signal to provide received information having an error factor that varies at least with respect to operational parameters of the receiver section, a method for adaptively controlling the operational parameters thereof to optimize the error factor of the received information, comprising the steps of:
   (a) operating in a first receiver mode in response to a predetermined mode select parameter;
   (b) correlating a first signal recovered from the received information to at least a portion of a first code word to establish a first error criteria when operating in said first receiver mode;
   (c) maintaining operation in the first receiver mode when the first error criteria does not exceed a predetermined error criteria; and
   performing steps (b) and (c) when a group count does not equal a predetermined group count.

2. The method according to claim 1 wherein the first signal is a group identifier.

3. The method according to claim 1 wherein the first signal is a bit synchronization preamble.

4. The method according to claim 1 wherein the first signal is a frame synchronization word.

5. The method according to claim 1 wherein the first signal is a test word.

6. The method according to claim 1 wherein the first signal is an address word.

7. The method according to claim 1 wherein the first signal is a data word.

8. The method according to claim 1 further comprising the steps of:
   (d) operating in a second receiver mode in response to the first error criteria exceeding the predetermined error criteria; and
   (e) correlating a second signal recovered from the information to at least a portion of a second code word to establish a second error criteria when operating in said second receiver mode.

9. The method according to claim 8 wherein the second signal is a group identifier.

10. The method according to claim 8 wherein the second signal is a bit synchronization preamble.

11. The method according to claim 8 wherein the second signal is a frame synchronization word.

12. The method according to claim 8 wherein the second signal is a test word.

13. The method according to claim 8 wherein the second signal is an address word.

14. The method according to claim 8 wherein the second signal is a data word.

15. The method according to claim 8 further comprising the step of:
   (f) performing steps (d) and (e) while the group count does not equal the predetermined group count.

16. The method according to claim 15 further comprising the steps of:
   (g) switching from the second receiver mode to the first receiver mode in response to the second error criteria exceeding the first error criteria.

17. The method according to claim 15 further comprising the steps of:
   (g) switching from the first receiver mode to the second receiver mode in response to the first error criteria exceeding the second error criteria.

18. The method according to claim 8 wherein the first and second receiver modes are low and high gain modes, respectively.

19. The method according to claim 8 wherein the first and second receiver modes are high and low gain modes, respectively.

20. The method according to claim 8 wherein the first and second error criteria are established using at least one BCH code word syndrome.

21. The method according to claim 8 wherein the first and second error criteria are established using a bit-by-bit correlation.

22. The method according to claim 21 wherein the bit-by-bit correlation comprises the step of:
   (f) exclusive-oring a predetermined bit pattern with a received bit pattern yielding a resultant bit pattern.

23. The method according to claim 22 wherein the resultant bit pattern comprises all like bits for an error-free correlation.

24. The method according to claim 22 wherein the resultant bit pattern comprises at least one un-like bit for an error-present correlation.

25. The method according to claim 8 wherein the first and second error criteria are established using a weighted number of correlation samples that are individually accumulated in each of the first and second receiver modes.

26. A radio receiver capable of being selectively addressed and having a receiver section that receives and processes an information signal to provide received information having an error factor that varies at least with respect to operational parameters of the receiver section, comprising:
   (a) means for operating in a first receiver mode in response to a predetermined mode select parameter;
   (b) means for correlating a first signal recovered from the received information to at least a portion of a first code word to establish a first error criteria when operating in said first receiver mode; and
   (c) means for maintaining operation of means (b) when a group count does not equal a predetermined group count, the first error criteria does not exceed a predetermined error criteria, and the receiver is operating in the first receiver mode.

27. The radio receiver according to claim 26 wherein the first signal is a group identifier.

28. The radio receiver according to claim 26 wherein the first signal is a bit synchronization preamble.

29. The radio receiver according to claim 26 wherein the first signal is a frame synchronization word.

30. The radio receiver according to claim 26 wherein the first signal is a test word.

31. The radio receiver according to claim 26 wherein the first signal is an address word.

32. The radio receiver according to claim 26 wherein the first signal is a data word.

33. The radio receiver according to claim 26 further comprising:
(d) means for operating in a second receiver mode in response to the first error criteria exceeding the predetermined error criteria; and
(e) means for correlating a second signal recovered from the information to at least a portion of a second code word to establish a second error criteria when operating in said second receiver mode.

34. The radio receiver according to claim 33 wherein the second signal is a group identifier.

35. The radio receiver according to claim 33 wherein the second signal is a bit synchronization preamble.

36. The radio receiver according to claim 33 wherein the second signal is a frame synchronization word.

37. The radio receiver according to claim 33 wherein the second signal is a test word.

38. The radio receiver according to claim 33 wherein the second signal is an address word.

39. The radio receiver according to claim 33 wherein the second signal is a data word.

40. The radio receiver according to claim 33 wherein means (c), (d), and (e) operate when the group count does not equal the predetermined group count.

41. The radio receiver according to claim 33 further comprising:
(f) means for switching from the second receiver mode to the first receiver mode in response to the second error criteria exceeding the first error criteria.

42. The radio receiver according to claim 33 further comprising:
(f) means for switching from the first receiver mode to the second receiver mode in response to the first error criteria exceeding the second error criteria.

43. The radio receiver according to claim 33 wherein the first and second receiver modes are low and high gain modes, respectively.

44. The radio receiver according to claim 33 wherein the first and second receiver modes are high and low gain modes, respectively.

45. The radio receiver according to claim 33 wherein the first and second error criteria are established using at least one BCH code word syndrome.

46. The radio receiver according to claim 33 wherein the first and second error criteria are established using a bit-by-bit correlation.

47. The radio receiver according to claim 46 wherein the bit-by-bit correlation comprises exclusive-oring a predetermined bit pattern with a received bit pattern yielding a resultant bit pattern.

48. The radio receiver according to claim 47 wherein the resultant bit pattern comprises all like bits for an error-free correlation.

49. The radio receiver according to claim 47 wherein the resultant bit pattern comprises at least one un-like bit for an error-present correlation.

50. The radio receiver according to claim 33 wherein the first and second error criteria are established using a weighted number of correlation samples that are individually accumulated in each of the first and second receiver modes.

* * * * *